Oct. 13, 1964
L. A. MEDLAR
3,153,186
MULTIPLE BATTERY CHARGERS
Filed June 10, 1960
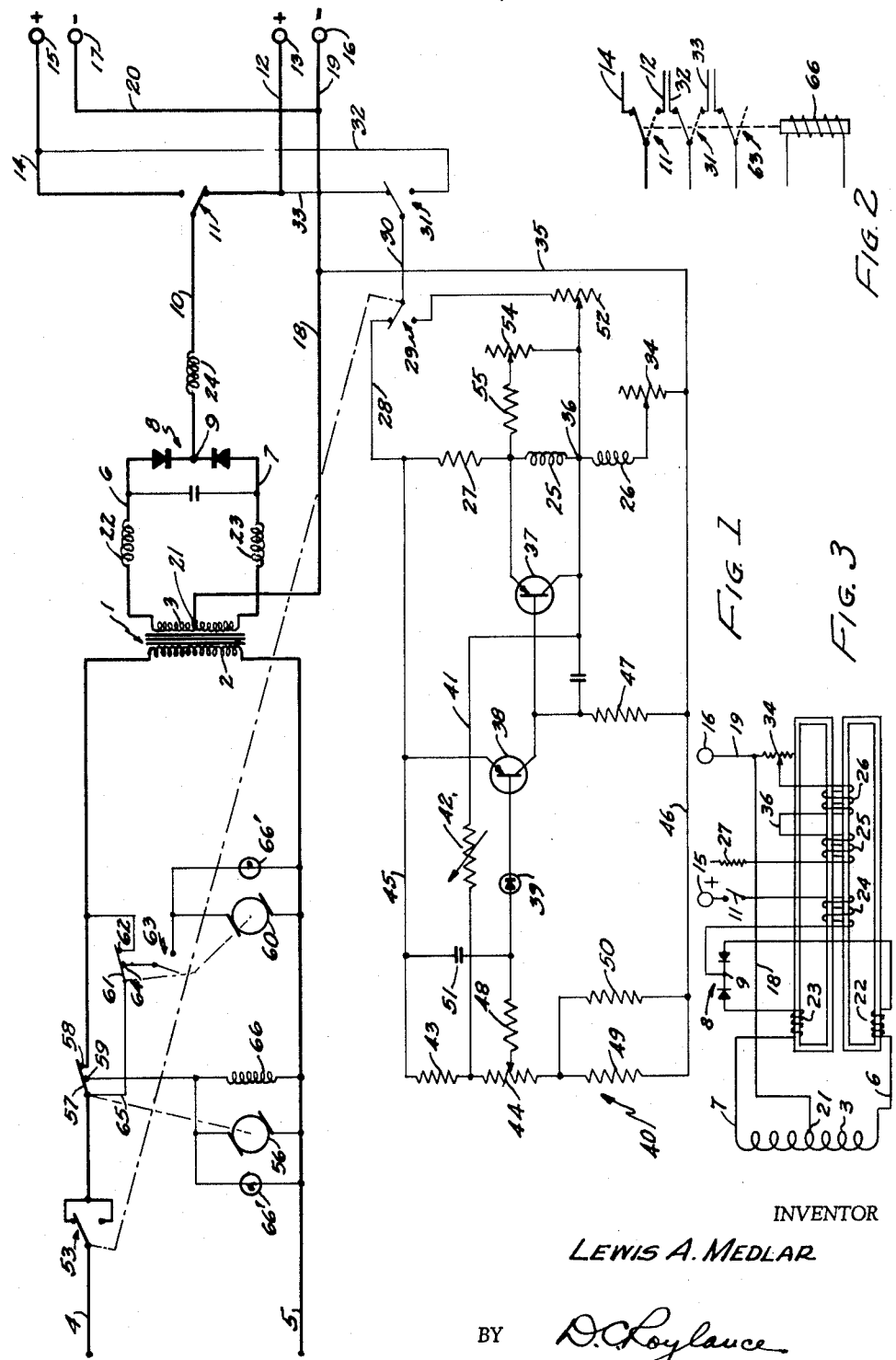
INVENTOR
LEWIS A. MEDLAR
BY D. C. Roylance
ATTORNEY

United States Patent Office 3,153,186
Patented Oct. 13, 1964

3,153,186
MULTIPLE BATTERY CHARGERS
Lewis A. Medlar, Oreland, Pa., assignor to Fox Products Company, Philadelphia, Pa., a corporation of Pennsylvania
Filed June 10, 1960, Ser. No. 35,225
1 Claim. (Cl. 320—15)

This invention relates to battery chargers and more particularly to an improved battery charger for successively charging in controlled fashion a plurality of storage batteries.

In numerous fields, it is desirable to employ a battery charger capable of acting automatically and dependably, in the absence of an operator, to charge at least two storage batteries, or two sets of storage batteries, in succession. With the advent of battery powered electrical golf carts, for example, country clubs have found it practical to employ chargers capable of successively charging the batteries of at least two carts, charging being carried out at night when no one is at hand to observe the charger. For best results, such a charger should function automatically to charge the battery or set of batteries to which it is connected first at a relatively high rate, until the terminal voltage of the battery or batteries reaches a desired value indicative of a given state of charge, and then at a relatively low rate to complete charging, this cycle then being automatically repeated for the next battery or set of batteries.

Since such chargers must be essentially automatic, adequate provision must be made to assure automatic termination of charging, both during a normal cycle of recharge of a typical battery and in abnormal cases where, for example, the battery or batteries being charged fail to attain the desired terminal voltage to which the control circuit is to respond.

A general object of the invention is to devise a battery charger capable of satisfying the requirements mentioned above.

Another object is to provide a relatively simple charger capable of charging two batteries or sets of batteries in succession with each battery or set of batteries being charged at a high rate, terminated automatically upon occurrence of a predetermined battery voltage, and then at a lower rate. In this connection, a further object is to provide such a charger in which at least the high rate charging current is maintained substantially constant.

Yet another object is to provide a charger of the type described in which operation of the charger can be accomplished under manual control in order that batteries which have been subjected frequently to charging under automatic control can be given an equalizing over charge.

In order that the manner in which these and other objects are attained in accordance with the invention can be understood in detail, reference is had to the accompanying drawings, which form a part of this specification, and wherein:

FIG. 1 is a schematic diagram of a charger constructed in accordance with one embodiment of the invention, FIG. 2 is a diagrammatic illustration of a relay employed in the charger shown in FIG. 1, and FIG. 3 is a schematic diagram of a saturable reactor and associated control circuit.

Referring now to the drawings in detail, it will be seen that the embodiment of the invention here illustrated comprises a transformer 1 including a primary winding 2 and a secondary winding 3, the primary of the transformer being connectable to a source of alternating current (not shown) via conductors 4 and 5. The end terminals of secondary winding 3 are connected, via conductors 6 and 7, to a center-tapped rectifier indicated generally at 8.

The center tap 9 of rectifier 8 is connected, via conductor 10, to the movable contact of a single pole double throw contact set indicated generally at 11. One fixed contact of set 11 is connected via lead 12 to a connector 13, the other fixed contact of set 11 being connected via lead 14 to a connector 15. Connectors 16 and 17 are connected, via conductor 18 and leads 19 and 20, respectively, to the center tap 21 of transformer secondary 3.

Leads 12 and 19 form one set of charging leads, to be employed for connecting the charger to a first battery or set of batteries, by means of connectors 13 and 16, when the movable contact of set 11 is in its lower position, as viewed in the drawings. Leads 14 and 20 form a second set of charging leads for connecting the charger to a second battery or set of batteries when the movable contact of set 11 is in its upper position, as viewed. Assuming that alternating current is supplied to transformer 3 via conductors 4 and 5, it is obvious that pulsating direct current will be supplied to the battery or set of batteries to be charged, depending upon the position of the movable contact of contact set 11.

In this embodiment of the invention, all charging carried out by the apparatus is accomplished with substantial constancy of charging current so that, among other things, variations in terminal voltage of the battery or batteries can be taken as truly indicative of state of charge. To accomplish the desired control of the charging current, I employ a saturable reactor and associated control circuit in the general fashion described and claimed in my copending application Serial Number 820,031, filed June 12, 1959, now abandoned.

The saturable reactor is of the type comprising two closed saturable cores of magnetic material, each carrying one of the impedance or gate windings 22 and 23, the windings 22, 23 being each connected in a different one of the conductors 6 and 7 as shown in FIG. 3. A feedback coil 24, connected in conductor 10, is wound around both of two adjacent legs of the two cores of the reactor. Two control windings 25 and 26, oppositely wound about the same adjacent legs as is the feedback winding and both having the same number of turns, are provided.

The magnetomotive forces resulting from the current flow in gate windings 22 and 23 oppose the magnetomotive forces resulting from current flow in feedback coil 24 and control winding 25 but aid the magnetomotive forces resulting from current flow in control winding 26. Constancy of charging current is attained as a result of operation of the saturable reactor in a servo system fashion, the magnetomotive force generated by feedback coil 24, viewed as the "output" being compared with the net magnetomotive force generated by control coils 25, 26, the overall net magnetomotive force determining the degree of saturation of the reactor and hence determining the output current supplied to the rectifier.

Control coils 25, 26 are connected across the rectifier output, and thus across the battery or set of batteries being charged, in series opposition. One terminal of winding 25 is connected alternatively to leads 12 and 14 via resistance 27, conductor 28, one fixed contact and the movable contact of a single pole double throw contact set 29, conductor 30, single pole double throw contact set 31 and conductors 32, 33. One terminal of control winding 26 is connected to conductor 18, and therefore to both leads 19 and 20, via rheostat 34 and conductor 35. The other terminals of the two control coils are connected together, as at 36. Considering only those circuit portions so far described, it is obvious that the voltage of the battery or batteries to which the apparatus is connected would cause current to flow through the two control windings 25, 26 in series, so that the net control magnetomotive force from coils 25 and 26 would be zero.

Connected in shunt relation with control winding 25 is a transistor 37, forming part of a control circuit including as its other main elements a second transistor 38, a zener diode 39 and a voltage divider indicated generally at 40.

Transistors 37, 38 are both of the P-N-P type, each including an emitter, a collector and a base. The emitter of transistor 37 is connected to a point between coil 25 and resistance 27, while the collector is connected to junction point 36 between the two control coils and also, via conductor 41 and adjustable resistance 42, to the junction point between a resistance 43 and the potentiometer 44 of the voltage divider 40.

The terminal of voltage divider 40 at resistance 43 is connected to conductor 28 via conductor 45. The other terminal of the voltage divider is connected via conductor 46 to conductor 35. The emitter of transistor 38 is connected directly to conductor 45, while the collector of that transistor is connected, via a resistance 47, to conductor 46. The base of transistor 37 is connected directly to the collector of transistor 38. The base of transistor 38 is connected, via zener diode 39 and a resistance 48, to the adjustable contact of potentiometer 44.

Voltage divider 40 is completed by a resistance 49 connected between potentiometer 44 and conductor 46, this resistance being shunted by a thermally responsive resistance 50 for temperature compensation. Resistances 43, 49 and potentiometer 44 can be of any values required for derivation from the battery or set of batteries of the proper operating voltages for the zener diode 39. A fixed condenser 51 is connected between conductor 45 and the junction between resistance 48 and zener diode 39.

Zener diode 39 is so poled as to receive current from the battery or set of batteries only in the inverse (high resistance) direction. So long as the terminal voltage of the battery or set of batteries to which the control circuit is connected is below a predetermined value (to which value the control circuit is to respond for reduction of the charging current) the voltage applied to the zener diode is inadequate to cause the diode to conduct. However, when the battery voltage reaches the predetermined value, the voltage applied to the zener diode is adequate to cause the same to conduct in its inverse direction. Once the diode is made conducting in this fashion, the voltage drop thereacross remains substantially constant, regardless of variation of the current through the diode.

The remaining fixed contact of contact set 29 is connected, via rheostat 52 to the junction 36 between control coils 25, 26. The movable contact of contact set 29 is ganged for simultaneous operation with the movable contact of a single pole double throw center off contact set 53, the latter being interposed in conductor 4 in such fashion that conductor 4 is interrupted when the movable contact of set 53 is centered and is completed when that movable contact engages either of its two cooperating fixed contacts. As will be later explained, contact sets 29 and 53 provide for manual selection between automatic operation and manual operation of the charger.

The series combination of a rheostat 54 and a resistance 55 is connected across control coil 25.

A first manually-setable time switch comprising electrical drive motor 56, a movable contact 57 and a fixed contact 58 is provided to terminate the flow of charging current when a battery or set of batteries is connected to the first set of charging leads 12 and 19. Motor 56 is connected between conductors 4 and 5, as shown, by means including a fixed contact 59 embodied in the first time switch and engaged by movable contact 57 thereof only when that movable contact also engages fixed contact 58.

Connected in parallel with the contact set of the first time switch is the contact set of a second manually-setable time switch including electrical driving motor 60, movable contact 61 and fixed contact 62. As shown, motor 60 is connected between conductors 4 and 5 via a circuit including, in series, a single pole single throw contact set 63, a fixed contact 64, movable contact 61 and conductor 65, the latter being connected to conductor 4 between movable contact 57 and the alternating current source. Contact 64 is embodied in the contact set of the second time switch and is disposed to be engaged by movable contact 61 only when that movable contact also engages fixed contact 62. As will appear hereinafter, the second time switch may be manually set at any time but is active to terminate the charging current only when the second set of charging leads 14, 20 is employed.

Contact sets 11, 31 and 63 are all embodied in a single electromagnetically operated relay, shown in detail in FIG. 2, the actuating winding 66 of the relay being connected between conductors 4 and 5 via fixed contact 59. It will thus be clear that the relay is energized only when the first time switch is in such position that the movable contact 57 engages fixed contacts 58 and 59. When the relay is energized by current flow through winding 66, contact set 11 is actuated to connect the output of the charging circuit to the first set of charging leads 12 and 19, contact set 31 is actuated to connect conductor 30 to lead 12 and contact set 63 is open. Accordingly, the control circuit is connected to respond to the terminal voltage of the battery or set of batteries connected to the first set of charging leads 12, 19. At this time, the drive motor 60 of the second time switch, contact set 63, is open.

Assuming, on the other hand, that the contacts of the first time switch are open and actuating winding 66 of the relay therefore de-energized, the second set of charging leads 14, 20 is then connected to the output of the charging circuit and, since contact set 63 is now closed, the drive motor 60 of the second time switch is energized. At this time, contact set 31 of the relay is in such position that conductor 30 is connected to charging lead 14 so that the control circuit can respond to the terminal voltage of the battery or set of batteries connected to the second set of charging leads.

A typical cycle of operation of the apparatus will now be described. Assuming that connectors 13 and 16 have been connected to a first battery or set of batteries and that connectors 15 and 17 have been connected to a second battery or set of batteries. Contact sets 29 and 53 are operated manually to place the movable contact of set 29 in engagement with the fixed contact to which conductor 28 is connected. Both time switches are adjusted manually to provide overall charging periods, determined by preliminary test of the batteries involved. Thus, movable contact 57 engages both contacts 58 and 59, movable contact 61 engaging both contacts 62 and 64. Since movable contact 57 engages contact 59, drive motor 56 of the first time switch runs and the actuating winding 66 of the relay is energized. Since winding 66 is energized, the drive motor 60 of the second time switch does not run, even though time switch contact 61 engages contact 64.

Charging current is supplied via the circuit comprising conductors 10, 12, 19 and 18 to the first battery or set of batteries and this charging current is maintained substantially constant by operation of the saturable reactor as hereinbefore described. Assuming that the terminal voltage of the battery or set of batteries to which connectors 13 and 16 are connected is below the predetermined value to which the control circuit is to respond, transistor 38 is fully nonconductive and transistor 37 fully conductive. Since transistor 37 shunts control coil 25, the full control current flows through coil 26. Hence, the net magnetomotive force from the control coils is at a maximum and the charger supplies its maximum output. As charging proceeds, and the terminal voltage of the battery or batteries therefore progressively increases, the voltage derived via voltage divider 40 and applied to the zener diode 39 increases to the predetermined critical value. Diode 39 then becomes conductive. At the instant diode 39 becomes conductive, the current therethrough is just sufficient to make transistor 38 conductive. The value of resistance 46 is so selected that the potential at the base of transistor 37 is at the edge of saturation for the transistor. Hence, a slight flow of current through transistor 38 causes the emitter-to-base potential of transistor 37 to decrease, resulting in a decrease of conductivity of transistor 37. Conductor 41 and resistance 42 form a positive feedback circuit such that, as transistor 37 becomes less conductive, less current flows through resistance 42 and a greater voltage is accordingly applied, via voltage divider 40, to zener diode 39. The emitter-to-collector current of transistor 38 therefore increases still further, resulting in a further decrease in the potential at the base of transistor 37. Transistor 37 is thus positively caused to become completely nonconductive and is therefore no longer effective to shunt control coil 25.

Current from the battery or batteries now must flow through both control coils 25 and 26 in series. Since these coils are in opposition, and net magnetomotive force is greatly diminished, the magnetomotive force of feedback coil 24 must follow that of the control coils and therefore also is greatly diminished. Accordingly, the charging current supplied to the battery or batteries to which connectors 13 and 16 are connected is reduced.

Such action of the control circuit in reducing the charging current has no effect on the operation of the first time switch, contact 57 remaining engaged with contacts 58 and 59 until the actuating member of the time switch has been driven by operation of motor 56 a distance sufficient to cause the contacts to open. This timer is normally so set that the contacts of the time switch will not be opened until after a predetermined time period estimated by the operator to be markedly greater than that required to bring the battery or set of batteries connected to the first set of charging leads up to that predetermined terminal voltage to which the control circuit is to respond. Accordingly, assuming that the operator's estimate of the condition of the battery or batteries involved was accurate, the battery or batteries will be subjected to a first period of relatively high rate, constant current charging terminated by the control circuit and followed immediately by a second period of low rate finishing charging, again with the charging current maintained substantially constant, the total period of charging, including both high rate and low rate, being determined entirely by the first time switch.

When the first time switch acts to terminate the supply of charging current via the first set of charging leads, with movable contact 57 returning to open position, relay winding 66 is de-energized. Contact set 63 accordingly closes, bringing the second time switch into operation, motor 60 now being energized. Simultaneously, contact set 31 connects conductor 30 to charging lead 14, and contact set 11 acts to connect the charge output to leads 14, 29. Thus, the charger is now connected to the second battery or set of batteries to be charged, and the control circuit is connected across the proper set of charging leads.

It will be understood that the function of the control circuit at this stage in the cycle of operation of the apparatus is to assure that the second battery or set of batteries, to which the charger is now connected, will be charged at a high rate so long as the battery voltage is below the predetermined cutoff value. In this connection, reference must now be made to the manner in which operation of the control circuit is started. The "pull in" voltage for the control circuit is selected to be equal to or lower than the open circuit voltage of a typical fully discharged battery of the type intended to be charged by the apparatus. Thus, under normal conditions, assuming that the apparatus is connected to a battery and charging is to be initiated, the battery voltage appearing in the control circuit will be somewhere in the range between the "pull in and cutoff" voltages. At the outset, whether the control unit will be in the "cutoff" or "on" condition depends on whether power transistor 37 is the first to conduct or gain transistor 38 is the first to conduct. As will now be described, the control circuit is biased to the "on" condition by the action of condenser 51. In the one energized state, condenser 51 is discharged by resistances 48 and 43 and part of the potentiometer 44. When voltage is applied to the control circuit, the time constant of the circuit constituted by condenser 51, resistances 48 and 43 and part of potentiometer 44 slows the charging of the condenser so that the voltage across the condenser, and thus across zener diode 39, is markedly below the "pull in" point for the control circuit, and this condition continues for a period of time which, while short, is enough to prevent conduction of gain transistor 38 until conduction of power transistor 37 has been established and the feedback circuit comprising resistance 42 has set the proper steady state voltage condition in voltage divider 40. Accordingly, even if the control circuit has just cut off, all that is necessary to place it back in operation is to de-energize the same momentarily. Assuming that such de-energization is accomplished, the circuit will "pull in," and power transistor 37 will "pull in" until the voltage across zener diode 39 stabilizes, the circuit thereafter either staying "on" or cutting off, depending on the battery voltage derived via the voltage divider.

Momentary de-energization of the control circuit preparatory to charging of the second battery or set of batteries is accomplished by contact set 31. Referring particulary to FIG. 2, it will be seen that the movable contact of this set must pass through an intermediate position, in which it engages neither of the fixed contacts of the set, whenever the relay is either energized or de-energized. This switching action, in addition to accomplishing connection of the charger output to the proper battery or set of batteries, assures that current cannot flow from either battery or set of batteries to the control circuit during a momentary period. Use of the separate contact set 31 to accomplish switching of the control circuit is also effective to prevent flow of current from rectifier 8 to the control circuit during the switching interval.

Returning to operation of the apparatus with the second battery or set of batteries now connected thereto, it will be understood from the foregoing that the control circuit is now effective to assure high rate charging. When the terminal voltage of the second battery or set of batteries increases to the predetermined cutoff point, the control circuit will again function in the manner hereinbefore described to reduce the charging current to a predetermined level suitable for a finishing charge. Assuming that the operator's estimate of the condition of the second battery or set of batteries was correct, this action of the control circuit will of course occur prior to opening of the contacts of the second time switch. The low rate finishing charge will thus continue until terminated by that time switch. When movable contact 61 disengages from contacts 62 and 64, all operation of the charger is terminated.

It will be noted that control coil 25 has connected in parallel therewith a circuit portion including a rheostat 54. This is provided to allow adjustment of the low or finishing charge rate, it being understood that adjustment of the rheostat can be made such as to decrease the effect of coil 25, so providing a small net magnetomotive force from the two control coils, even though the power transistor 37 is nonconductive and the two coils therefore actively in series opposition.

In order that an indication can be had as to which of the two batteries or sets of batteries connected to the charging leads is being charged, two pilot lights 66' are provided, each being connected in parallel with a different one of the time switch motors 56, 60. Thus, the pilot lights are energized only when the corresponding timer motor is running.

In order to provide flexibility of the charger in use, provision is made for manual operation, still employing the saturable reactor to control the charging current. Thus, it will be seen that contact set 29, manually operated, is effective to disconnect conductor 28 and connect the series combination of the movable contact of contact set 31 and rheostat 52 to the junction point 36 between control coils 25 and 26. Thus, when the movable contact 29 is in the lower position as viewed in the drawing, the control circuit will be connected across one or the other set of charging leads, depending upon whether relay coil 66 is energized or de-energized. Such connection places control coils 25 and 26 in magnetically aiding relationship. Since this connection of the control coils would normally provide a high net control magnetomotive force, the rheostat 52 is provided to cut down the control magnetomotive force to that range desired for proper operation of the circuit. By operation of contact sets 29 and 53 to select manual operation, the charger is so conditioned that that portion of the control circuit which is arranged to respond to battery voltage is eliminated, only the time switch means and rheostat 52 being connected actively to control operation of the charger.

While one particularly advantageous embodiment of the invention has been described for illustrative purposes, it will be understood that numerous changes and modifications can be made without departing from the scope of the invention as indicated by the appended claim.

I claim:

In apparatus for charging a pair of batteries successively, the combination of
- a transformer-rectifier charging circuit;
- a saturable reactor including
  - a pair of gate windings connected in said charging circuit to control current flow therethrough, and
  - a pair of control windings;
- switching means for selectively connecting said charging circuit to one or the other of the batteries being charged;
- a control circuit including
  - at least one transistor,
  - a voltage divider connected to sense the terminal voltage of the battery being charged,
  - a Zener diode connected between said voltage divider and said transistor such that said transistor is rendered conductive when said terminal voltage exceeds a predetermined value, and
  - a positive feedback circuit connected to said transistor and operative via said voltage divider to maintain said transistor in either the fully conductive or fully nonconductive state;
- circuit means interconnected between said transistor and one of said control windings to selectively shunt said one control winding in accordance with a particular conductive state of said transistor so that the high charging current flows initially and substantially, decreased charging current flows once said terminal voltage has exceeded said predetermined value; and
- timer circuit means operative via said switching means to connect said charging circuit to one of the batteries for a predetermined period of time not affected by the operation of said control circuit and then connect said charging circuit to the other battery for a like period of time.

References Cited in the file of this patent

UNITED STATES PATENTS

| | | |
|---|---|---|
| 1,118,099 | Beach | Nov. 24, 1914 |
| 1,208,044 | Suren | Dec. 12, 1916 |
| 2,496,859 | Dalzell | Feb. 7, 1950 |
| 2,549,854 | Salazar | Apr. 24, 1951 |
| 2,635,221 | Harvey | Apr. 14, 1953 |
| 2,751,545 | Chase | June 19, 1956 |

UNITED STATES PATENT OFFICE
CERTIFICATE OF CORRECTION

Patent No. 3,153,186                                      October 13, 1964

Lewis A. Medlar

It is hereby certified that error appears in the above numbered patent requiring correction and that the said Letters Patent should read as corrected below.

Column 8, line 21, strike out "the"; line 22, strike out the comma; line 28, before "then" insert -- to --.

Signed and sealed this 19th day of January 1965.

(SEAL)
Attest:

ERNEST W. SWIDER                                   EDWARD J. BRENNER
Attesting Officer                                      Commissioner of Patents